United States Patent [19]
Petersen et al.

[11] Patent Number: 4,631,010
[45] Date of Patent: * Dec. 23, 1986

[54] HYDROSTATIC CONTROL DEVICE, PARTICULARY STEERING DEVICE

[75] Inventors: Hans C. Petersen, Nordborg; Erik Kyster, Augustenborg, both of Denmark

[73] Assignee: Danfoss A/S, Nordborg, Denmark

[*] Notice: The portion of the term of this patent subsequent to Dec. 10, 2002 has been disclaimed.

[21] Appl. No.: 550,320

[22] Filed: Nov. 10, 1983

[30] Foreign Application Priority Data

Jun. 30, 1983 [DE] Fed. Rep. of Germany ....... 3243401

[51] Int. Cl.$^4$ .......................... F03C 2/08; F16D 31/02
[52] U.S. Cl. ............................... 418/61 B; 137/625.21
[58] Field of Search .......................... 418/61 B, 75, 80; 60/384; 251/283; 137/625.21

[56] References Cited

U.S. PATENT DOCUMENTS 4,557,676 12/1985 Petersen et al. ............... 418/61 B Primary Examiner—Carlton R. Croyle
Assistant Examiner—Theodore W. Olds
Attorney, Agent, or Firm—Wayne B. Easton

[57] ABSTRACT

The invention relates to a hydrostatic control device for steering unit device which includes a metering motor and a flat slide directional valve. Slide surfaces of the directional valve are formed by the abutting end faces of an outer housing and a motor housing and between the two slide surfaces there is formed a high pressure zone. Between two end faces of the outer housing and the motor housing opposite thereto is an intermediate pressure zone of larger area which is connected between a first throttle gap associated with the high pressure zone and a second throttle gap leading to the low pressure zone. With the aid of the high pressure zone and the intermediate pressure zone equilibrium can be obtained while incurring only a minimum amount of friction.

15 Claims, 8 Drawing Figures

HYDROSTATIC CONTROL DEVICE, PARTICULARY STEERING DEVICE

The invention relates to a hydrostatic control device particularly a steering device, comprising a metering motor and a flat slide directional valve, wherein an outer housing carries connectors and the one slide surface and receives between two end faces a relatively rotatable motor housing, wherein the outer of two relatively rotatable motor parts forming compression chambers between each other is fixed to the motor housing, wherein a control shaft is connected to the one motor part and the other slide surface to the other motor part, and wherein the two slide surfaces are relatively rotatable against the force of a neutral spring through an angle fixed by rotation limiting means.

In a known hydrostatic steering device of this kind (U.S. Pat. No. 4,070,950) the steering shaft is connected to the motor housing which is disposed between two first end faces with an interposed axial bearing surrounding the steering shaft. By way of a cardan shaft, the inner motorpart is fixed to rotate with a plate which belongs to the flat slide directional valve and is disposed between two further end surfaces of the outer housing. The multiplicity of constructional components that are required makes the construction expensive. In addition, there is an unsteady steering behaviour.

A radial piston machine with a multi-way rotary valve is also known (U.S. Pat. No. 4,232,708) in which control orifices arranged in a circle on a fixed planar slide surface are connected to the radial cylinders and disposed between inlet control orifices and outlet control orifices. A rotary slide surface is formed by an annular plate which is rotatable with the cam truck of the machine and has blind holes which can connect respective adjacent control orifices. The fixed slide surface comprises an annular groove as a high pressure zone between which at the outer periphery of the annular plate, a first throttle gap is provided. The entire side of the annular plate remote from the slide surface serves as an intermediate pressure zone. An annular zone surrounding a central outlet passage and connected to the annular plate forms a second throttle gap together with a fixed pin. By reason of the equal pressures on both sides of the annular plate, there is a position of equilibrium.

The invention is based on the problem of providing a hydrostatic steering device of the aforementioned kind which permits very accurate steering and has a simple construction.

This problem is solved according to the invention in that the slide surfaces of the directional valve are formed by the abutting end faces of the outer housing and motor housing, and that between the two slide surfaces there is formed a high pressure zone and between two end faces of the outer housing and motor housing opposite thereto an intermediate pressure zone of larger area which is connected between a first throttle gap associated with the high pressure zone and a second throttle leading to the low pressure zone.

The invention is based on the consideration that the unsteady control behaviour in the known control device is caused by the following circumstances. If the directional valve was in the neutral position and the control shaft was to be turned, it was necessary to overcome the friction between the plate of the directional valve and the adjacent end faces of the outer housing as well as between the motor housing and the adjacent end faces of the outer housing. The forces to be exerted for this purpose lead to overcontrol as soon as the friction had been overcome and consequently to unstable controlling as a whole. Because of the frictional forces and, in the presence of a cardan shaft or the like, because of the play between the metering motor and directional valve, one could also not ensure that the plate of the directional valve came to rest accurately in the neutral position. In order nevertheless to provide a good seal, a comparatively large dead zone was produced in the neutral position region.

In the construction according to the invention, the rotary part of the flat slide directional valve is unified with the motor housing so that only one constructional unit, namely the motor housing, has to be turned relatively to the outer housing. With the exception of the intermediate pressure zone, this constructional unit is subjected to hydraulic forces only on one side, namely the slide surface, because the forces occurring within the metering motor are taken up by the motor housing. Consequently, with the aid of the high pressure zone and the intermediate pressure zone, one can bring the motor housing as a whole into a position of equilibrium in which practically no friction is present. If, therefore, forces are applied to the steering wheel, the directional valve immediately starts to become adjusted so that no over-control occurs. Also, the directional valve is returned to the exact neutral position by the neutral position spring. This permits one to operate with very small dead zones in the region of the neutral position. Further, when using a cardan shaft or the like, there is no play between the outer motor part connected to the motor housing and the associated slide surface. All this improves the control property. The application of the movable slide surface to the motor housing also brings about considerable constructional simplifications. The dimension of the control device can be kept very small.

In many cases it is sufficient for the second throttle to be a fixed throttle. It is however, more favourable if the second throttle is formed by a second throttle gap which is associated with the intermediate pressure zone and changes oppositely to the first throttle gap. Since the first and second throttle gaps change in the opposite sense upon displacement of the motor housing, a very accurate axial position of the plate is achieved under all operating conditions without contact of the adjoining end faces of the outer housing.

It is advisable for the slide surfaces to be arranged on the side of the motor housing opposite the steering shaft. Since the slide surfaces are not influenced by the steering shaft cross-section, a large area is obtained on which not only the control apertures necessary for the valve function can find a place with sufficient spacing, but a defined high pressure zone can also be accommodated.

It is also favourable if the parts of the motor housing are held together by axial screws and the screw holes terminate in front of the slide surface. This likewise contributes to keeping the slide surface large.

In a preferred embodiment, the intermediate pressure zone is disposed between the end face of the motor housing remote from the slide surface and the adjoining end face of the outer housing. Here there is sufficient space to accommodate the intermediate pressure zone, use being made of surfaces tat are provided in any case.

Good results have been obtained if the first throttle gap is formed between a circumferential groove defining the high pressure zone and the circumference of the motor housing. In particular, a connection to the intermediate pressure zone is obtained along the motor housing circumference without having to take any additional measures.

If the outer connections are disposed on the side of the outer housing facing the flat slide directional valve, an outlet passage leading to the low pressure side can desirably pass completely through the metering motor at about the middle. Usually, there are no difficulties to provide apertures in the middle of the metering motor. In this way, pressure fluid can be discharged from the intermediate pressure zone even when the latter is located on the side of the motor housing opposite the slide surfaces.

If a fixed second throttle is employed, it may be disposed in the outlet passage.

There are various possibilities for forming the second throttle gap. In particular, it may be formed between the intermediate pressure zone and the adjacent mouth of the outlet passage.

Another possibility is that the second throttle gap is located between an annular flange of the motor housing and an annular step of the outer housing. In this case, the surfaces bounding the first and second throttle gap have a comparatively small spacing from each other.

Another probability is that the second throttle gap is disposed between radially inwardly directed projections on the outer housing and an adjoining end face of the motor housing.

In an alternative, the second throttle gap is formed in the plane of the first throttle gap between a first insert connected to the first slide surface and engaging in a recess of the motor housing and a second insert which is connected to the second slide surface and engages in a recess of the outer housing.

It is particularly advantageous if the axial play of the motor housing is so small that in the neutral position the control apertures on the outlet side of the flat slide are sealed from the other control orifices even in the absence of pressure in the high pressure and intermediate pressure zones. In practice, a density will be sufficient in which the operating motor and/or metering motor do not lose liquid to any marked extent. In particular, the axial play may amount to about 5-50 micrometer, preferably about 10 micrometers. It has been found that, despite such small play which brings about the seal in an emergency, adjustment of the control hand wheel is possible practically without friction during normal operation.

It is also favourable for the high pressure zone to be connected by a respective check valve open towards it to the pump connection and each of the two operating motor connections. Since the highest pressure can occur at different positions of the control device depending on the operating conditions, this ensures that balancing the motor housing will always take place with the highest pressure and therefore sufficiently large forces will always be available for compensating the pressures arising at the individual control orifices.

It is sometimes advisable to provide low pressure zones defined between the slide surfaces. In this way, one can obtain balancing if the behaviour of the high pressure zone and the intermediate pressure zone cannot be brought to the optimum value for constructional reasons.

Preferred examples of the invention will now be described with reference to the drawing wherein.

Figure 1:
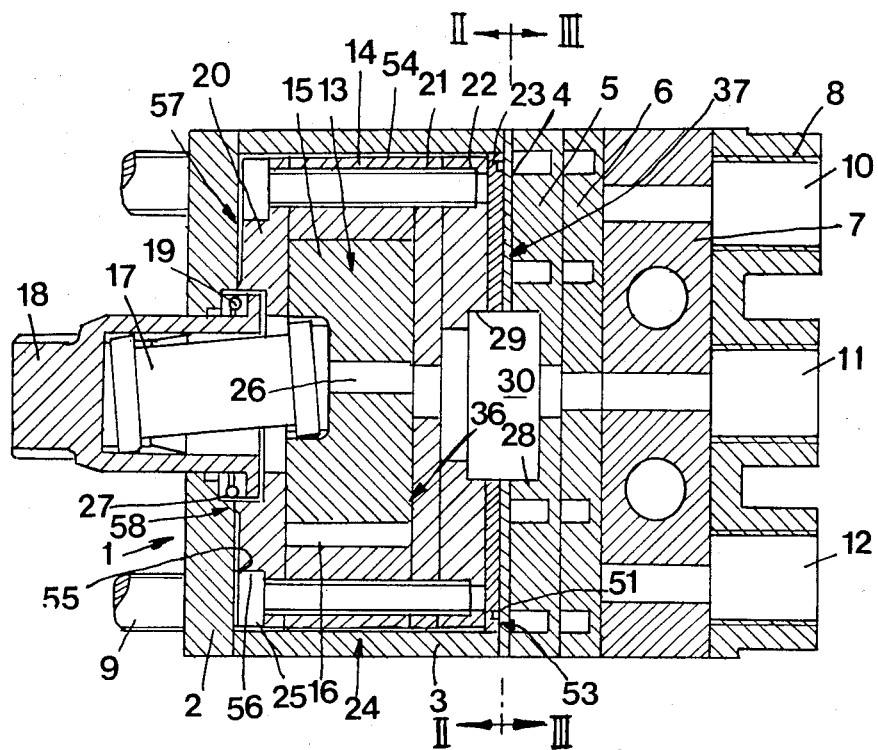
FIG. 1 is a longitudinal section through a control device according to the invention
Figure 2:
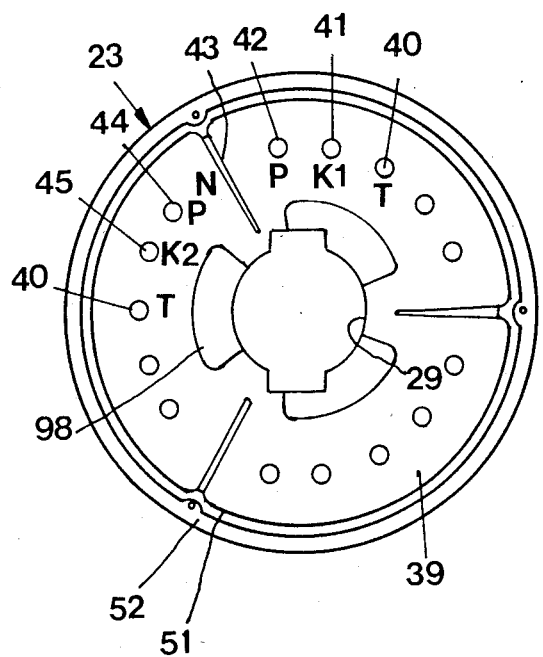
FIG. 2 is a second along the line II—II in FIG. 1.
Figure 3:
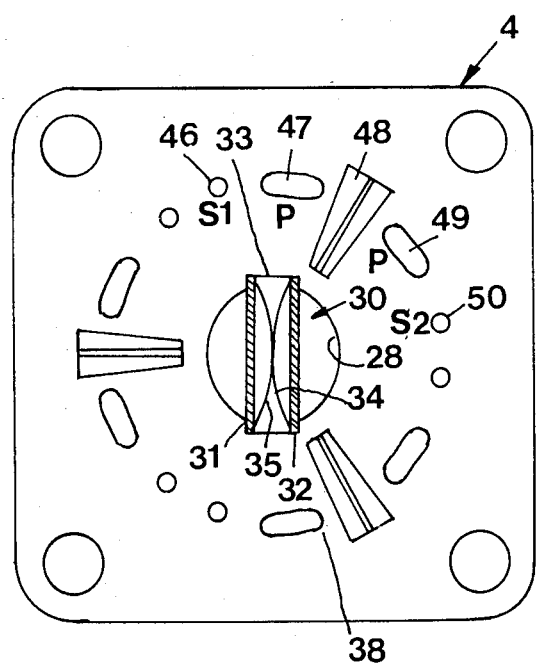
FIG. 3 is a section on the line III—III in FIG. 1.

In the FIGS. 1 to 3 embodiment, an outer housing 1 comprises an end wall 2, a sleeve 3, a valve plate 4, a passage plate 5, a passage plate 6, an intermediate plate 7 and a connecting plate 8 held together by tensioning screws 9. Some of the parts 4 to 7, for example the plates 4,5 and 6, can be permanently unified by soldering, welding or adhesion. The connecting plate 8 comprises five connections of which a pump connection 10, a container connection 11 and an operating motor connection 12 are visible. A second operating motor connection and a connection which is selectively connectible to an additional operating circuit or to the container are disposed outside the plane of the drawing. A metering motor 13 comprises an internally toothed gear ring 14 and an externally toothed gear 15 defining compression chambers 16 between each other. The gear 15 is connected by way of a cardan shaft 17 to a control shaft 18 which may be provided with a control hand wheel. The control shaft 18 is supported on the outer housing 1 by an axial bearing 19. The gear 15 turns and planetates in relation to the gear ring 14. The latter defines, together with an end wall 20, a distributing valveplate 21, an intermediate plate 22 and a slide valve 23, a motor housing 24 which is held together by screws 25. Here, too, the plates 21 to 23 may be permanently interconnected. The slide plate 23 covers the screw holes.

The container connection 11 is connected to an opening 27 near the end wall 2 by way of an outlet passage 26 formed by bores in the metering motor 13 and the other parts of the machine. The outlet passage includes a depression 23 in plates 4 and 5 as well as a depression 29 in plates 22 and 23. These have an arrangement 30 inserted in the manner shown in FIG. 3. This arrangement comprises rotation limiting means in the form of two supporting bars 31 and 32 inserted in extensions 33 of the depression corresponding to the corners of a rectangle. Between these there are neutral position springs 34 and 35 in the form of two curved leaf springs. A distributing valve 36 is formed between the distributing valve plate 21 and the side of the gear 15. A flat slide directional valve 37 is formed between the two plates 23 and 24. Further details in the construction of the control device shown in FIG. 1 will be evident from Applicants' co-pending patent application "Hydrostatic control device, particularly steering device" (DA634). This will show particularly the connection between the connections and the control orifices in the slide surface 38 of valve plate 4 as well as between the control orifices in the slide surface 39 of valve plate 23 and in the distributing valve 36 as well as the construction thereof.

According to FIG. 2, the slide surface 39 comprises three circumferentially successive sets of control orifices, namely a container control orifice 40 connected to the container T by way of the outlet passage 26 and the continer connection 11, a metering motor control orifice 41 connected to the one connection K1 of the metering motor 13, a pump control orifice 42, a neutral position control orifice 43 in the form of a radial slot, and a further pump control orifice 44 which are mutually interconnected, as well as a metering motor control orifice 45 communicating with the connection K2 of the metering motor. This is followed by another container control orifice 40. The slide surface 38 contains an operating motor control orifice 45 connected by way of the one operating motor connector 12 to the connection 51 of the operating motor bringing out the control movement, a pump control orifice 47 connected to the pump P by way of the pump connection 10, a neutral position control orifice 48 the form of a radial slot followed by throttle depressions and connected by a connection (not shown) to the container or a subsequent operating circuit, a further pump control orifice 49 and an operating motor control orifice 50 communicating with the operating motor. These control orifices are likewise repeated cyclically.

It will be seen that in the neutral position the pump connection 10 communicates by way of the control orifices 47,42 and 49,44 with the neutral position control orifices 43,48, i.e. then an "open-centre" operation. On the other hand, the metering motor control orifices 41 and 45 as well as the operating motor control orifices 46 and 50 are closed. If the control shaft 18 is turned clockwise, the gear 15 follows and, since the compression chambers 16 are closed, so will the gearing 14. Consequently, the slide surface 39 turns relatively to the slide surface 38. Now, the connection by way of the neutral position control orifices 43,48 is gradually throttled. The pump control orifice 47 comes into communication with the metering motor control orifice 41 and the metering motor control orifice 45 with the operating motor control orifice 50. In addition, the operating motor control orifice 46 comes to cover the container control orifice 40. Pressure fluid therefore flows by way of the metering motor to the operating motor and then back to the container. The quantity compressed in the metering motor accurately corresponds to the angle of rotation of the control shaft, so that the operating motor is adjusted very accurately proportionally to the control shaft rotation. Reverse conditions apply for rotation in the clockwise sense.

By means of an annular groove in the slide surface 39 of motor housing 24, a high pressure zone 51 is formed because this annular groove is fed with the pump pressure by way of the neutral position control orifices 43. Together with the slide surface 38 of the outer housing 1, the adjoining marginal zone 52 forms a first throttle gap 53 which opens into an annular gap 54 between the motor housing 24 and sleeve 3. On the opposite side, an intermediate pressure zone 57 is produced between the end face 55 of the outer housing 1 and the end face 56 of the motor housing 24, the intermediate pressure zone being bounded at the radially inner circumference by a second throttle gap 58 which leads to the opening 27 of the outlet passage 26. The axial play of the motor housing 24 permitted by the throttle gaps 53 and 58 between the end wall 55 of outer housing 1 and the slide surface 38 amounts to only 10 micrometre in this example. This means that, in the absence of the pump, pressure fluid can be pushed neither out of the operating motor nor out of the metering motor in the neutral position.

When the pump is operative, a small leakage current flows from the high pressure zone 51 over the first throttle gap 53 to the intermediate pressure zone 57 and further, by way of the second throttle gap 59 to the outlet passage. Because of the two throttle gaps, there is a subdivision of the pressure so that the intermediate pressure in zone 57 assumes a value which opposes the forces exerted on the slide surface 39. If the motor housing 24 is displaced slightly to the left by reason of hydraulic forces existing at the control orifices, the intermediate pressure will rise so that the motor housing 24 will be only slightly displaced from the desired position. Upon displacement to the right, the intermediate pressure drops so that the original position is again almost maintained. The regulation is so accurate that, despite the small axial play, no friction arises and, to turn the slide valve, only the force of the neutral position springs needs to be overcome but not any marked friction.

Figure 4:
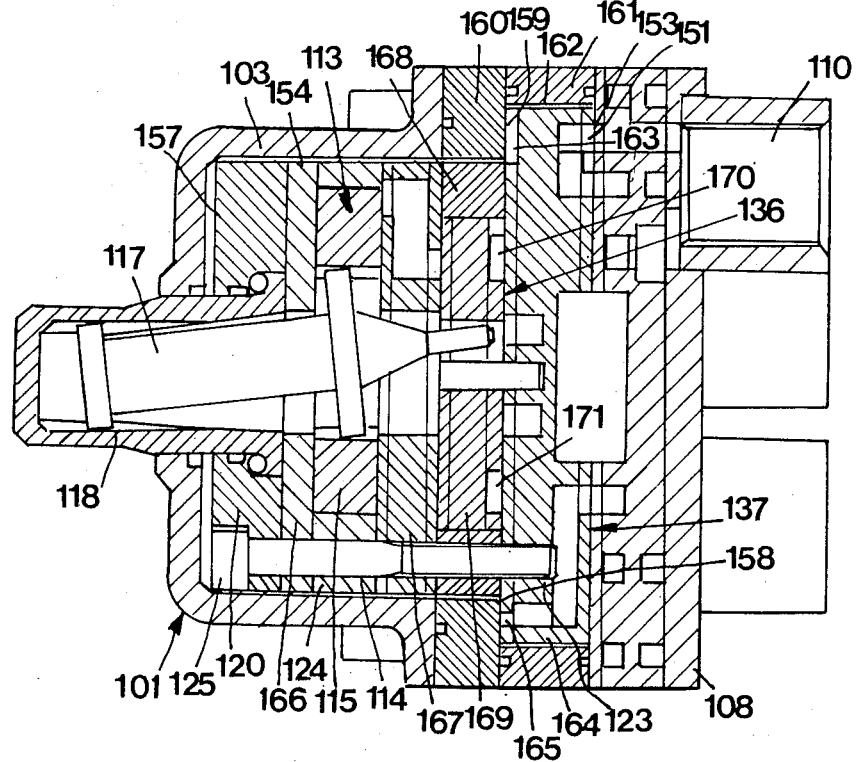
FIG. 4 is a longitudinal section through a second embodiment.

In the FIG. 4 embodiment, corresponding parts have the same reference numerals increased by 100. The difference is that the outer housing 101 includes a ring 160 forming an annular step 159 and a further ring 161 with a width which is few micrometre larger than that of the valve plate 123. A first throttle gap 153 is provided in a manner similar to that described in the previous example. Leakage fluid can therefore reach the intermediate pressure zone 157 through the annular gap 162, radial passages 163 and the annular gap 154. Second throttle gaps 158 are produced between the annular step 159 and an annular flange 164 which is formed by the valve plate 123 and in which a plurality of bores 165 distributed over the circumference are in communication with the container connector. The motor housing 124 comprises the end plate 120, a further plate 166, the gear ring 114, a passage plate 167, a ring 168 and the valve plate 123. Within the ring 168 there is a distributing valve plate 169 which is carried along in sequence with planetation of the gear 115 by the cardan shaft 110. It has two crescent-shaped grooves 170, 171 in known manner by way of which the compression chambers are provided with pressure fluid in the correct sense.

In this construction, an intermediate pressure is set up in the chamber 157. By reason of the two throttle gaps 153 and 158, this intermediate pressure has such a value that the motor housing 124 assumes a defined position.

Figure 5:
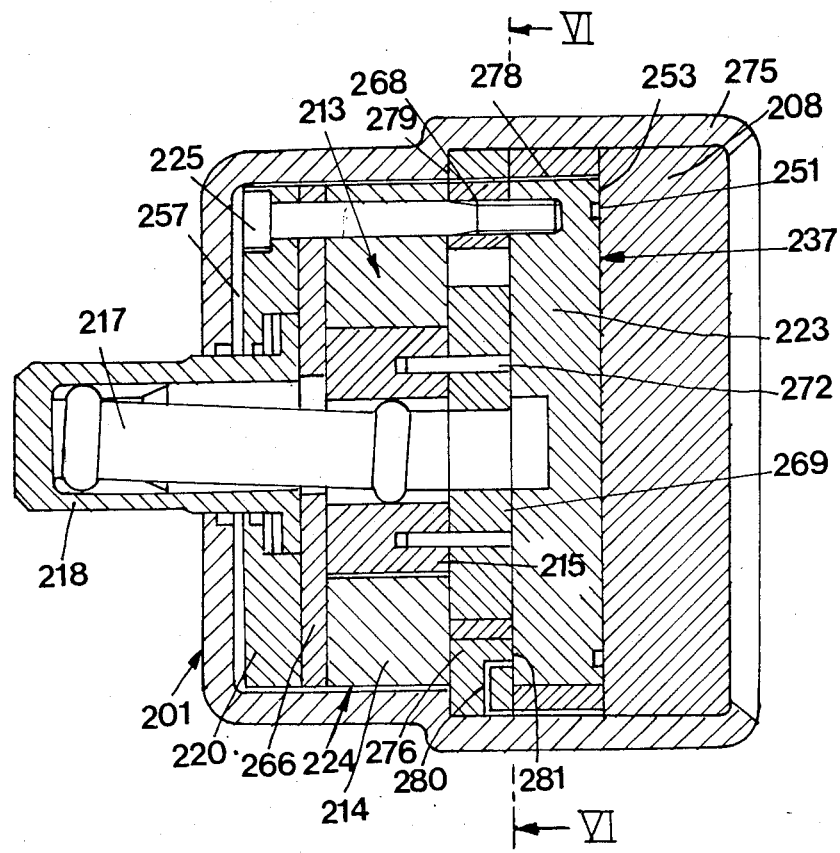
FIG. 5 is a longitudinal section through a third embodiment.
Figure 6:
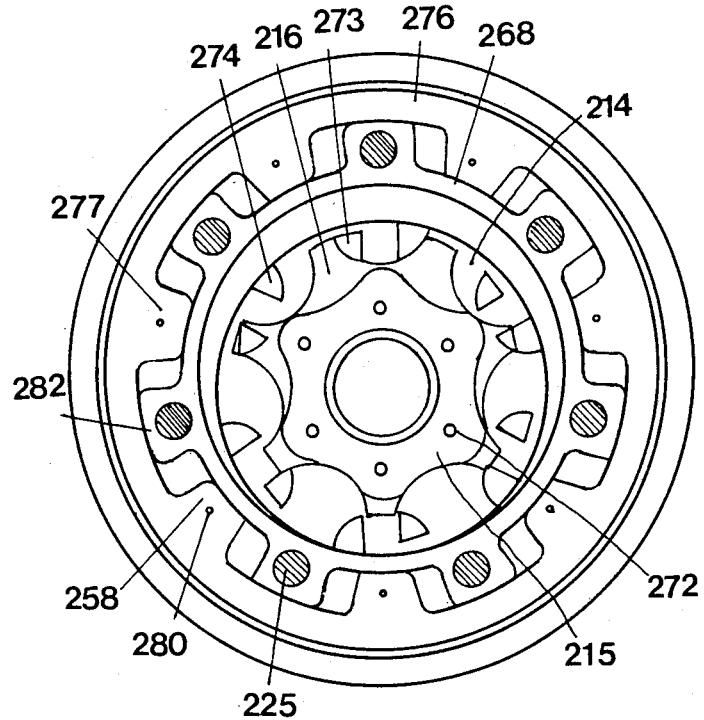
FIG. 6 is a section on the line VI—VI in FIG. 5.

In the embodiment of FIGS. 5 and 6, corresponding parts have reference numerals increased by 200. In this case, a distributing valve plate 269 is connected by pins 272 to the gear 215 so that the compression chambers 216 are alternately connected in known manner to the control orifices 273 for the inlet flow and control orifices 274 for the outlet flow, in valve plate 223.

The outer housing 201 is pot-shaped and holds all the parts together by means of a bead 275. A ring 276 with inwardly directed projections 277 is here pressed by an intermediate ring 278 against an end face 279 of the inner housing 201. In the radial projections 276 there are bores 280 which are covered by the end face 281 of valve plate 223, so that they produce second throttle gaps 258 in addition to the first throttle gap 253 that is provided at the usual position. Conversely, radial arms 282 on the ring 268 engage outwardly so that rotational limitation is produced between the parts 277 and 282.

In this case, the intermediate pressure in the space 257 again depends on the width of the first throttle gap 253 and the width of the second throttle gap 282, so that the motor housing 224 assumes a position which departs only slightly from the desired position.

Figure 7:
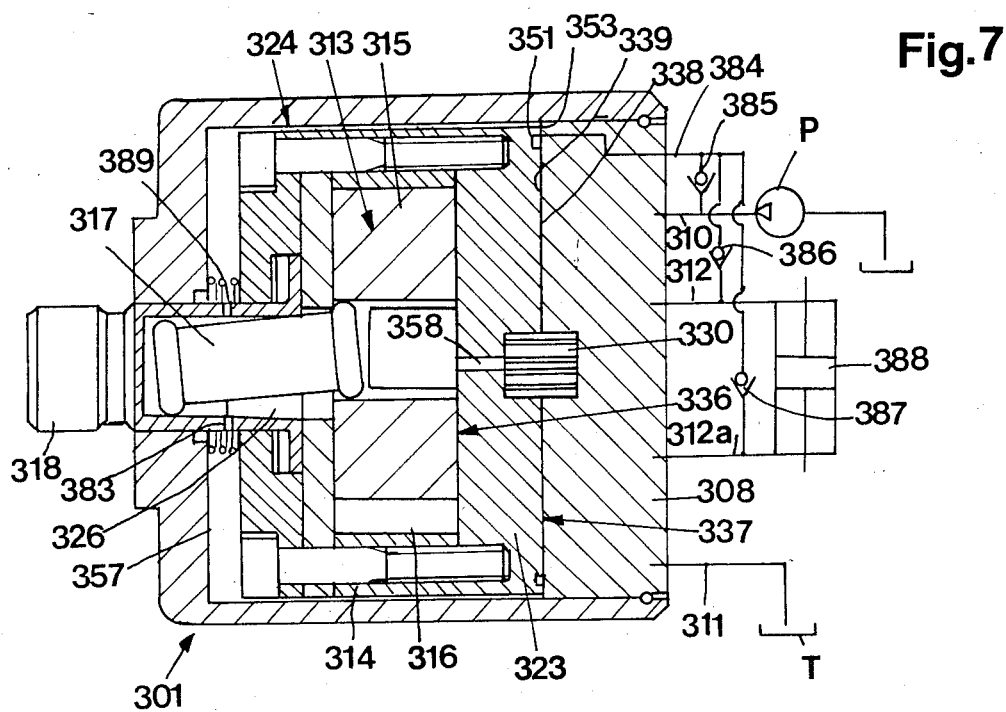
FIG. 7 is a longitudinal section through a fourth embodiment.

In the embodiment according to FIG. 7, corresponding parts have reference numerals increased by 300. In this case, the second throttle 358 is a bore in the valve plate 323 leading to the container connection 311. In this way, the intermediate pressure zone 357 is connected by bores 383 and the outlet passage 326 to the second throttle and further to the container T. The bores 383 may also serve as second throttle.

In addition, the conduit 384 leading to the high pressure zone 351 is connected by way of a first check valve 385 to the pump connection 310 and by way of two further check valves 386 and 387 to the connection 312 and 312a for the operating motor 388. In this way, one ensures that the highest pressure is always effective in the high pressure zone 351. This is also true in the case of emergency control, i.e. when the pump P has failed. A weak compression spring 389 holds the slide surfaces 338 and 339 against each other on starting. As soon as the motor pressure is present, the motor housing 324 is pressed against the valve plate 308 because the intermediate pressure rises when the motor housing 314 moves to the left.

Figure 8:
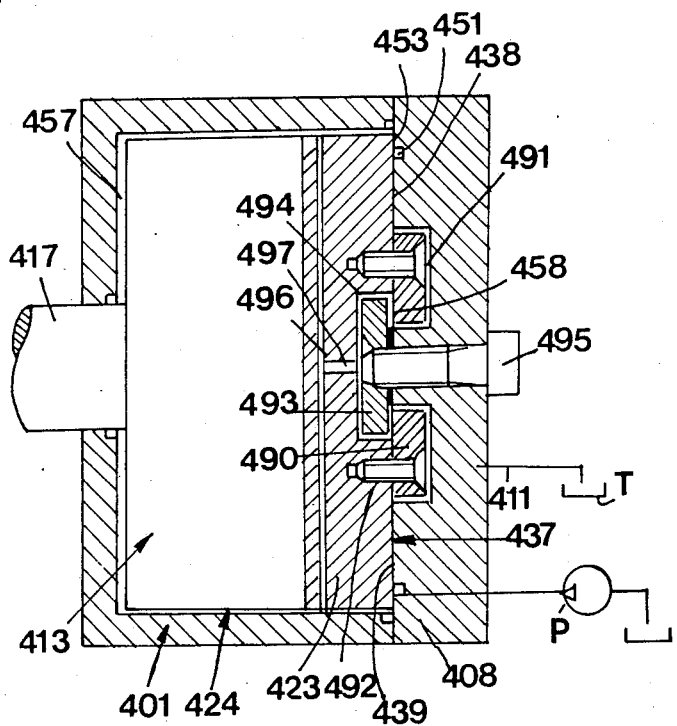
FIG. 8 is a longitudinal section through a fifth embodiment.

In the FIG. 8 embodiment, corresponding parts have reference numerals increased by 400. Here, the high pressure zone 451 is formed by an annular groove in the plate 408 fixed with respect to the housing. The second throttle gap 458 is disposed in the same plane as the first throttle gap 452. It is formed between an annular plate insert 490 inserted in a depression 491 of the slide surface 438 and secured by screws 492 to the valve plate 423 and an an insert 493 which is inserted in a depression 494 of the slide surface 439 and secured by a screw 495 to the fixed valve plate 408. Passages 496 and 497 connect the second throttle 458 to the intermediate pressure zone 457.

In this embodiment, pressure fluid flows from the high pressure zone 451 by way of the first throttle gap 453 into the intermediate pressure zone 457 and then by way of the passages 496 and 497 into the depression 494, whereafter it flows by way of the second throttle gap 458 at depression 491 to the container connection 411. Every enlargement of the one throttle gap leads to a reduction of the other throttle gap. This results in the desired control of the intermediate pressure when the lifting off forces change in the vicinity of the slide surfaces.

The construction of the metering motors 13 is not restricted to the gear machines with planetating gear as illustrated. Other possibilities are gear machines with two fixed but eccentric axes, vane-type machines, radial piston machines and other known hydraulic machines. Further, apart from the high pressure zone 51, the slide surfaces may also be provided with marked low pressure zones 98 in the manner shown in FIG. 2 to reduce the zone in which pressure can build up between the slide surfaces.

We claim:

1. A hydrostatic steering control device, comprising, a housing having a plurality of ports including inlet and outlet ports and motor ports connectable to an external servomotor, a metering motor having a casing rotatably mounted in said housing, a rotor mounted in said metering motor casing and being moveable relative thereto to form expansible and collapsible chambers, control shaft means connected to said rotor, directional valve means having opposite turn functions, said directional valve means having relatively rotatable planar faces between said housing and said metering motor casing and being operable upon said shaft means turning said casing and said rotor in unison, commutating valve means between said metering motor casing and said rotor, resilient means for maintaining said directional valve means in a neutral position in the absence of a turning force on said shaft, passage means cooperable with and connecting said housing ports with said directional valve means and said commutating valve means, said directional valve means being operable for each said turning function to (1) route pressure fluid from said inlet port through one side of said commutating valve means to expanding chambers of said metering motor and pressurized fluid from collapsing chambers of said metering motor to one of said motor ports and (2) route fluid from the other of said motor ports to said outlet port, means providing in one of said planar surfaces an annularly shaped high pressure zone near the periphery thereof, first throttle means between said planar surfaes radially outwardly from said high pressure zone, said housing and said metering motor casing having adjacent annularly shaped wall means at the opposite end thereof from said directional valve means, second throttle means between said adjacent wall means providing an intermediate pressure zone between said first and second throttle means and a low pressure zone downstream from said second throttle means, said adjacent wall means upstream from said second throttle means being sufficient relative to said high pressure zone to provide a net pressure force in a direction biasing said directional valve planar faces towards each other.

2. A control device according to claim 1 wherein said first and second throttles are formed by throttle gaps which form said intermediate pressure zone therebetween.

3. A control device according to claim 1 wherein said directional valve means planar surfaces are on the side of said metering motor casing opposite from said control shaft means.

4. A control device according to claim 1 wherein said intermediate pressure zone is at least partially between said adjacent wall means.

5. A control device according to claim 1 wherein said means providing a high pressure zone includes a circumferential groove in one of said planar surfaces and passage means for connecting said groove to said inlet port, said first throttle means being a throttle groove formed radially outwardly from said groove.

6. A control device according to claim 5 wherein said circumferential groove is in said planar surface of said metering motor casing.

7. A control device according to claim 1 wherein said plurality of ports includes a tank port, passage means extending centrally of said device from said tank port to the downstream side of said second throttle means.

8. A control device according to claim 7 wherein said second throttle means is in said outlet passage means.

9. A control device according to claim 7 wherein an opening is provided between the radially inward portions of said adjacent wall means and said outlet passage means, said second throttle gap being between said intermediate pressure zone and said opening.

10. A control device according to claim 1 wherein said annularly shaped wall means of said metering motor casing has the form of an annular flange, said second throttle means being a throttle gap formed between said annular and said wall means of said housing.

11. A control device according to claim 2 wherein said housing has radially inward extending projections, said second throttle gap being between said radially inwardly extending projections and said wall means of said metering motor casing.

12. A control device according to claim 1 wherein one of said planar faces has a central recess and the other of said planar faces has an overlapping annularly shaped recess, a circular insert disposed in said central recess and attached to said other planar face, an annular insert disposed in said annularly shaped recess and attached to said one planar surface, passage means from said intermediate pressure zone to said central recess, said second throttle means being between said inserts in the same plane as said first throttle means.

13. A control device according to claim 1 wherein the axial play of said metering motor casing relative to said housing is so small that in said neutral position orifices in said planar surfaces of said directional valve means are sealed respectively from other control orifices in said planar surfaces even in the absence of pressure in said high pressure and said intermediate pressure zones.

14. A control device according to claim 13 wherein said axial play ranges from 5 to 50 micrometers.

15. A control device according to claim 1 including check valve means between said high pressure zone on one side and said pump inlet and said motor ports on the other side.

* * * * *